UNITED STATES PATENT OFFICE.

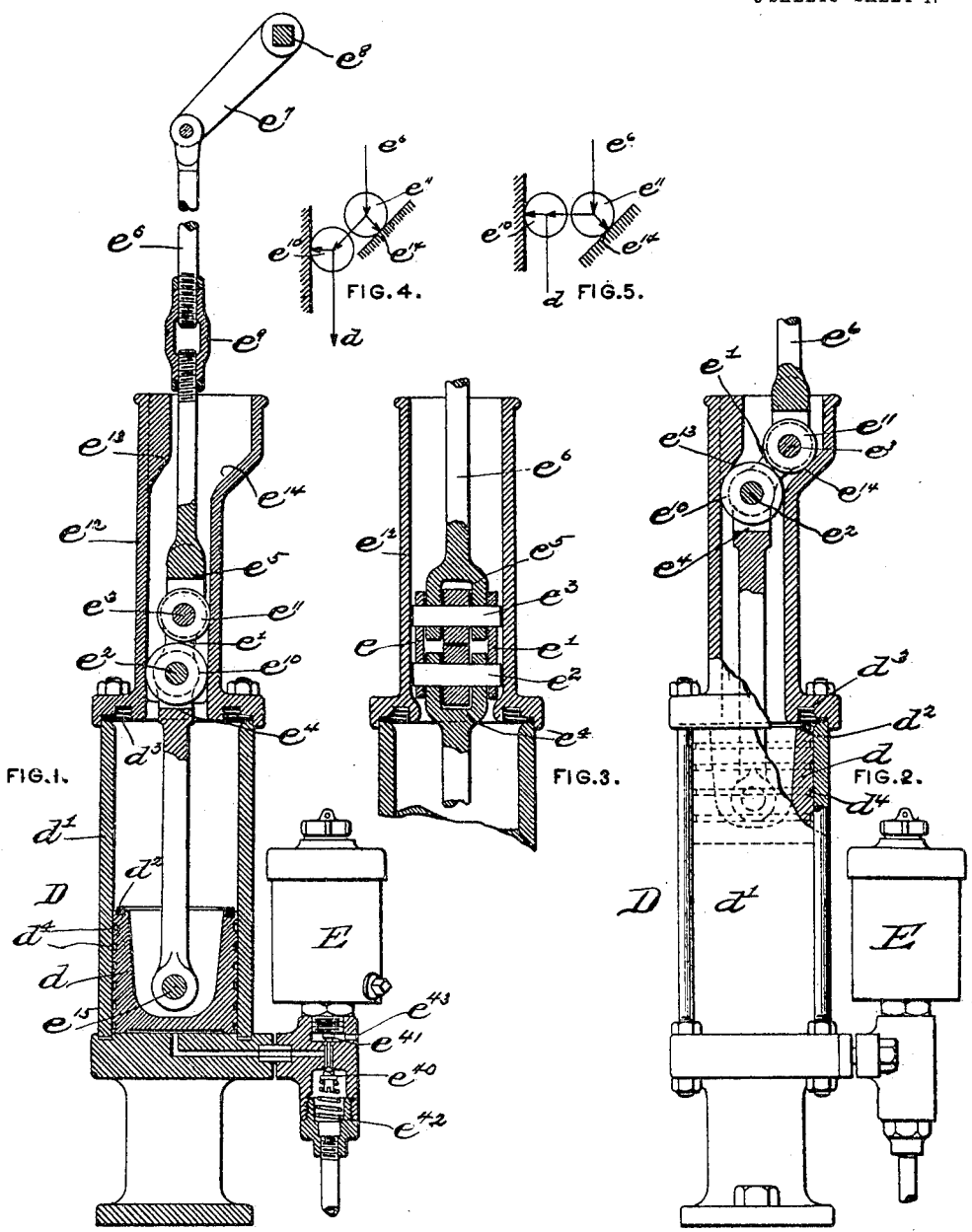

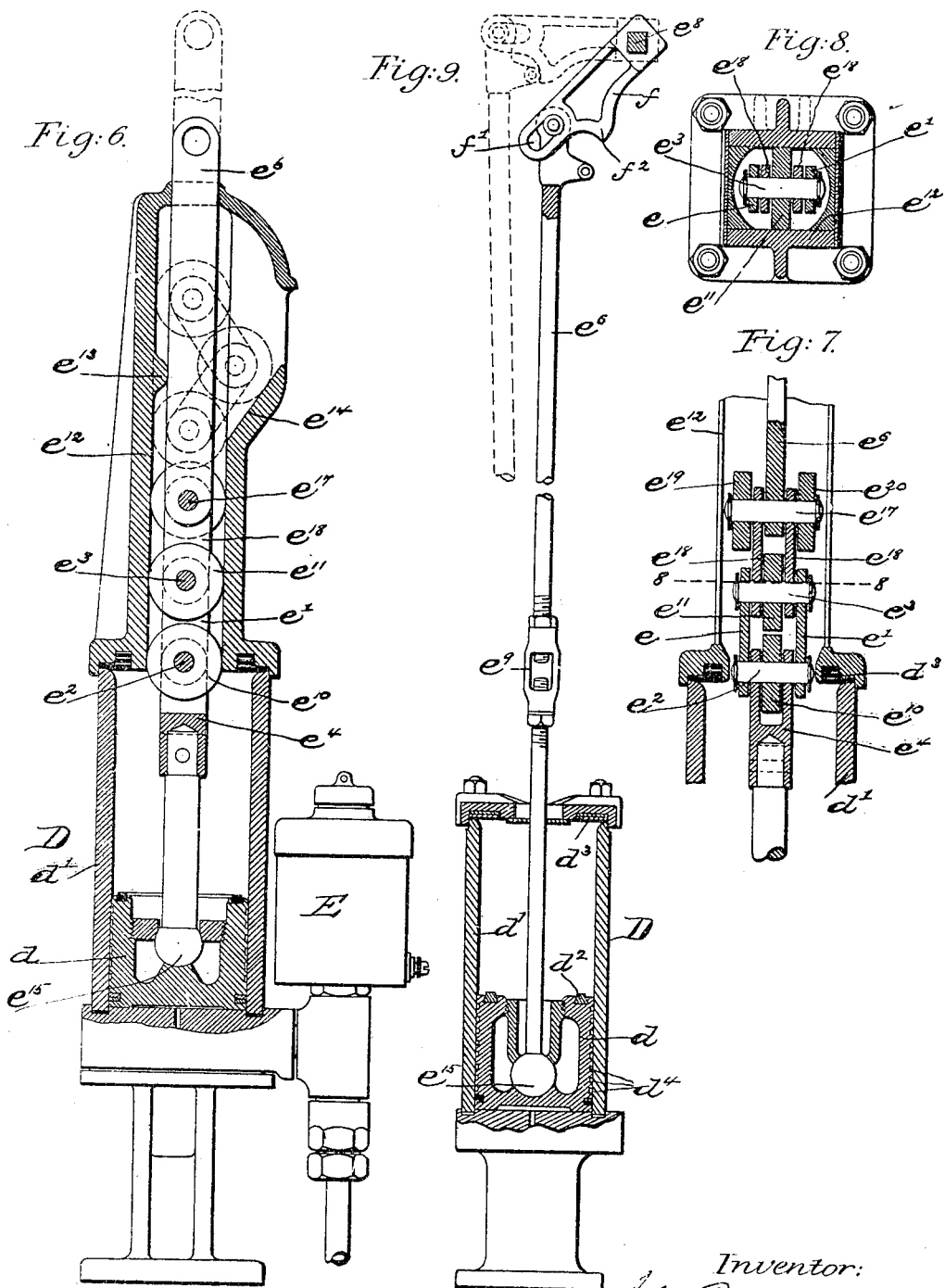

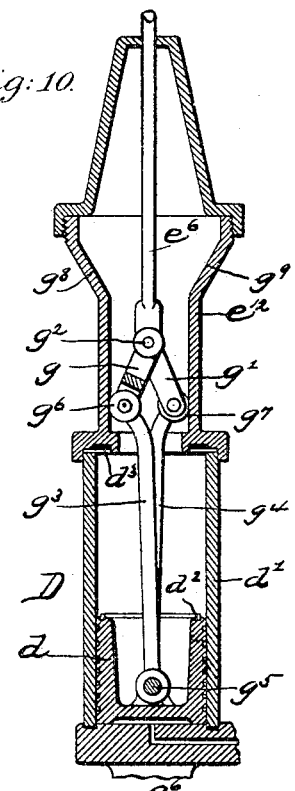
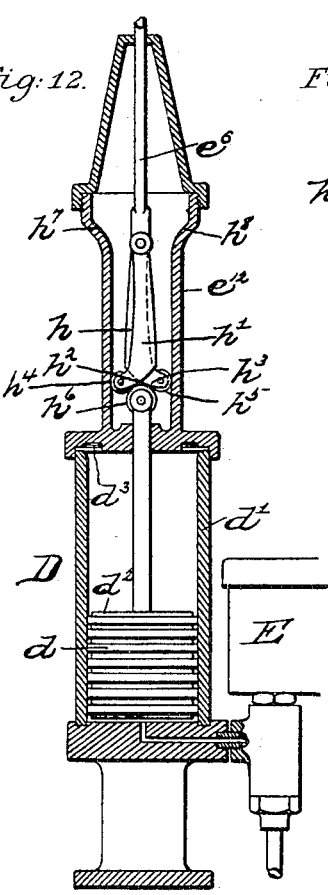
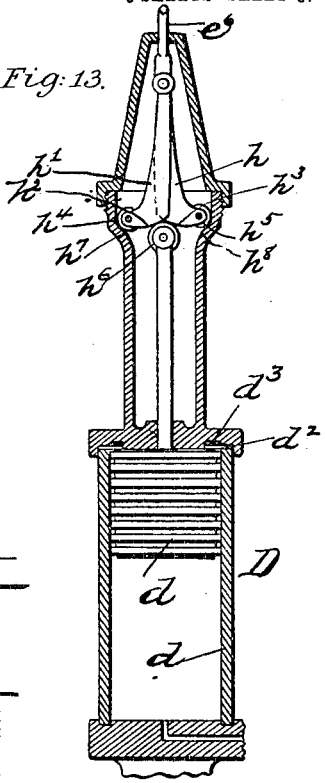
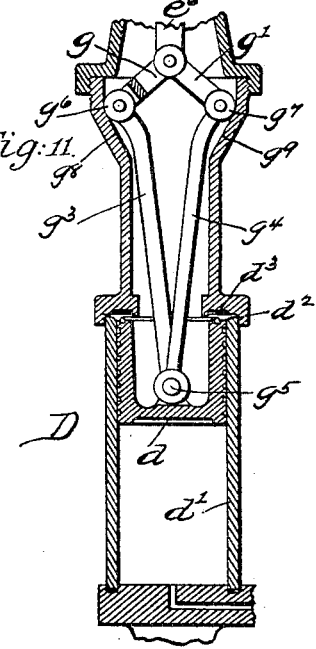
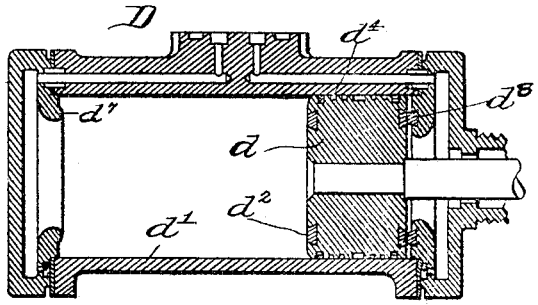

JOHN PRESSLEY COLEMAN, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA.

FLUID-PRESSURE APPARATUS.

No. 799,145.  Specification of Letters Patent.  Patented Sept. 12, 1905.

Application filed October 8, 1903. Renewed June 21, 1905. Serial No. 266,345.

*To all whom it may concern:*

Be it known that I, JOHN PRESSLEY COLEMAN, a citizen of the United States, residing at Edgewood, in the county of Allegheny and State of Pennsylvania, have invented certain new and useful Improvements in Fluid-Pressure Apparatus, of which the following is a specification.

My invention relates to fluid-pressure apparatus.

My invention particularly relates to that class of fluid-pressure apparatus wherein it is found expedient after its operation to retain the fluid-pressure in action upon the part or parts moved, such as against the piston of an ordinary cylinder.

My invention has for an object the minimizing or total elimination of losses in such devices that result from leakage of the fluid-pressure through or past, or both, the packings of the piston or other parts so retained under pressure.

I will describe a fluid-pressure apparatus embodying my invention and an application thereof to a railway-signal and then point out the novel features thereof in claims.

In the accompanying drawings, Figure 1 is a vertical sectional view of a fluid-pressure apparatus as applied to a railway-signal and embodying my invention. Fig. 2 is a view similar to Fig. 1, but showing the parts in a different position. Fig. 3 is a vertical sectional view of a part of the apparatus shown in Figs. 1 and 2, the plane of section being at right angles to the plane of section of Figs. 1 and 2. Figs. 4 and 5 are diagrammatical views illustrating a mechanical principle embodied in the form of invention shown in Figs. 1 and 2. Fig. 6 is a vertical sectional view showing a modification. Fig. 7 is a vertical sectional view of a part of the apparatus shown in Fig. 6, the plane of section being at right angles to the plane of section of Fig. 6. Fig. 8 is a detail horizontal sectional view, the section being taken on the line 8 8 of Fig. 7. Fig. 9 is a vertical sectional view showing another modification of my invention. Fig. 10 is a detail sectional view of another modification. Fig. 11 is a view similar to Fig. 10, but showing the parts in another position. Fig. 12 is a detail sectional view of another modification. Fig. 13 is a view similar to Fig. 12, but showing the parts in a different position. Fig. 14 is a detail sectional view showing my invention applied to a double-acting cylinder.

Similar letters of reference designate corresponding parts in all of the figures.

I will premise that wherever I herein use the term "signal" I mean a visual signal device which by its position relatively to its support or by its color gives indication of the service condition of the railroad-track or section of railroad-track which it governs. Also wherever I herein use the term "fluid-pressure" I mean a liquid or gas under pressure. I preferably employ a gas. Any gas may be used—as, for example, air or carbonic gas—and under any pressure which is sufficient or more than sufficient to operate the apparatus or mechanism. If the pressure of the gas or liquid be above that required for the operation of the apparatus or mechanism, pressure-reducing valves may be employed in proper or convenient places.

D designates a fluid-pressure apparatus which, as here shown, comprises a piston $d$ and a cylinder $d'$, within which the piston moves. The piston $d$ in all of the figures, with the exception of Fig. 14, is moved in one direction in the cylinder by means of fluid-pressure, which may be derived from any source. In Fig. 14 the fluid-pressure moves the pistons in both directions. The supply of fluid-pressure apparatus in all of the figures, with the exception of Fig. 14, is controlled by valves $e^{10}$ $e^{11}$, comprised in an electromagnetic valve device E. In Fig. 14 the supply of fluid-pressure may be controlled in any desired way. When the fluid-pressure apparatus of Fig. 14 is embodied in a switch-operating apparatus, the supply of fluid-pressure is electrically controlled in a manner well known in the art. The electromagnetic valve device E may conveniently be substantially of the form and arrangement illustrated and described in United States Patent No. 357,109, issued February 1, 1887, to Geo. Westinghouse, Jr., for electrical interlocking mechanism for switches and signals, to which patent reference may be had. It is only necessary to here state that each electrically-operated device E have the functions of opening a supply of fluid-pressure to the fluid-pressure apparatus when the magnet comprised in the device is energized, of closing the supply of fluid-pressure when said magnet is deënergized, and of opening an exhaust port or passage to the atmosphere from the fluid-pressure apparatus. When the valve $e^{40}$ is seated, the valve $e^{41}$ will be unseated, and vice versa. The valve $e^{40}$ is unseated and the valve $e^{41}$ seated when the electromagnet is energized, and in this position of the valves fluid-pressure will be admitted to the cylinder under the piston. When the electromagnet is deënergized, the valve $e^{40}$ will be seated by the spring $e^{42}$ and the fluid-pressure, and the valve $e^{41}$ will be unseated and fluid-pressure from the cylinder will escape past it and through an exhaust-port $e^{43}$.

$d^2$ designates a packing provided in the head of the piston $d$, and $d^3$ a packing provided in the head of the cylinder $d'$. Each of the packings is preferably of yielding and non-porous material—as, for example, leather when treated with certain lubricants—for example, paraffin or graphite—in order that comparatively uniform pressure between all points on the packings may be obtained when the piston has been fully moved and remains under pressure. Such fluid-pressure as may then escape through the usual piston-packings $d^4$ is confined to the cylinder above the piston and between the walls of the cylinder and the packings $d^2$ $d^3$, and further loss of pressure from under the piston is thus avoided. In other words, the fluid-pressure escaping past the packings $d^4$ will be confined by the walls of the cylinder and the packing-rings and will of itself form a packing to prevent further leakage of the fluid-pressure. In Figs. 1, 2, 3, 6, 7, and 9 the packing $d^3$ is in the form of washers placed one on another, while the packing $d^2$ is in the form of a single ring. In Figs. 10, 11, 12, and 13 the packing $d^3$ is in the form of a single ring. The same form of packing $d^3$ shown in these last figures may be used in the apparatus shown in Figs. 1 to 7. In fact, the packings $d^2$ $d^3$ may be in any convenient and effective form, provided they are of yielding and non-porous material. In Fig. 14 at the left of the figure the packing $d^3$ on one face of the piston seats against an annular metal rib $d^7$, provided on the cylinder-head, while at the right of the figure the packing seats against a packing $d^8$ of yielding and non-porous material—as, for example, leather when treated with a lubricant. If desired, the packing $d^8$ may be used at both ends of the cylinder, or instead the metal rib $d^7$ may be used at both ends of the cylinder. It will be understood that in the operation of switches by a fluid-pressure apparatus through a switch and lock movement the switch-rails are completely moved before the piston reaches the end of its stroke, so that the greatest load is removed from the piston and the excess fluid-pressure is available to seat the piston and produce the desired pressure against the packings, thereby reducing to a minimum the leakage of the fluid-pressure from the cylinder when the piston is at rest against the cylinder-head.

In the application of my invention to a railway semaphore-signal, which, as is well known, comprises a casting, generally termed a "spectacle," and a blade, and ordinarily constitutes a varying load upon the means or apparatus designed to move it, means are provided intermediate the fluid-pressure apparatus and the semaphore-signal which, in effect, increase the leverage of the fluid-pressure apparatus to meet a gradually-increasing load produced by the movement of the semaphore-signal, with the end in view of minimizing the consumption of fluid-pressure energy required for the signal's operation and to permit of the fluid-pressure seating the piston and its packing against the packing in the cylinder-head. By these intermediate means I am enabled to operate the semaphore-signal from one position of indication to another by a uniform and minimum pressure under the piston. The intermediate means embraces a jointed connection between the piston and the signal which during a predetermined part of the movement of the piston and signal so shifts as to increase the leverage of the piston's energy, and this leverage considerably exceeds at the completion of the piston's movement the leverage obtained during the major part of its earlier movement, and thereby enables the fluid-pressure to effectually seat the piston and prevent any leakage of the fluid-pressure past the piston. Conversely, this shifting of the jointed connection to increase the leverage decreases the downward thrust upon the piston prior to the completion of the latter's movement. The jointed connection also after it has been shifted acts as a lock, requiring very little fluid-pressure to have the lock effective after the semaphore-signal has been shifted.

Referring now to Figs. 1 to 5, the jointed connection comprises a pair of links $e\ e'$, which receive the ends of pins $e^2\ e^3$. The pin $e^2$ extends through the arms of a yoke $e^4$, provided at the end of the piston-stem, and the pin $e^3$ extends through the arms of a yoke $e^5$, provided on the end of a rod $e^6$, generally termed the "up-and-down rod." The upper end of the rod is here shown as being connected with an arm $e^7$, fast on a shaft $e^8$, on which the semaphore is secured. The rod $e^6$ is made adjustable, as shown at $e^9$. A roller $e^{10}$ is provided on the pin $e^2$, and a roller $e^{11}$ is provided on the pin $e^3$. $e^{12}$ designates a casing or housing which incloses the jointed connection. The casing has one lateral interior dimension, which is the same as one of the rollers of the jointed connection—for example, the roller $e^{10}$. The purpose of this casing is to prevent any shifting of the jointed connection during a predetermined part of the operation of the fluid-pressure apparatus, which isthe first part of the operation of the fluid-pressure apparatus. The casing is provided with means which will cause the jointed connection to shift or will permit the jointed connection to shift during the latter part of the operation of the fluid-pressure apparatus. As here shown, these means comprise a projection $e^{13}$, which is adapted to engage the roller $e^{11}$ and deflect it laterally onto an inclined surface $e^{14}$, which may form part of the casing. As stated, this deflection preferably takes place near the end of the operation of the fluid-pressure apparatus, at which time the semaphore-signal is exerting the greatest downward thrust due to its being heavier at that time. The varying downward thrust of the semaphore-signal during its operation has been explained in an application filed by me on the 29th day of August, 1903, Serial No. 171,177.

The operation of the apparatus just described is substantially as follows: When the piston is in its lower position, Fig. 1, and the signal at the horizontal or danger position of indication, the pins $e^2$ $e^3$ are in substantially a straight line drawn through the pivot-pin $e^{15}$ of the piston-stem and piston-head and the pin securing the rod $e^6$ to the signal or arm $e^7$. This relation of the pins is practically maintained during the first and greater part of the operation of the fluid-pressure apparatus and until the roller $e^{11}$ is engaged by the projection $e^{13}$, when it is shifted or deflected laterally onto the inclined surface $e^{14}$. The weight of the signal acting upon the pin $e^3$ holds the roller in engagement with the inclined surface until in its return movement the pin $e^3$ is again brought into or substantially into alinement with the pin $e^2$. By reason of this shifting or deflection of the pin $e^3$ during the upward movement of the piston and to the deflection of the force applied by the piston to the pin $e^2$ from a vertical line a further given stroke of the piston is not accompanied by as great a stroke of the rod $e^6$ vertically, the ratio of movement of these members constantly decreasing as the roller $e^{12}$ moves to the right until, were the stroke of the piston-stem not restricted or limited by the piston striking the cylinder-head, the roller and pin $e^3$ would assume a horizontal position with respect to the pin $e^2$ (see Fig. 5) and the load of the signal no longer exerts a downward pressure upon the piston and all the pressure under the piston would then be available for securing the pressure against the packings. Such a position of the pins $e^2$ $e^3$ is, however, objectionable, in that when the pressure is discharged from under the piston the weight of the signal would have no effect in returning the signal, the piston, and their connected parts to normal position. (See Fig. 1.) It is therefore important that the pin $e^3$ always remain above the level of pin $e^2$, and this is accomplished in the present instance by the relative location and arrangement of the parts $e^{13}$ and $e^4$. (See Figs. 1, 2, and 4.)

In Figs. 6, 7, and 8 I have shown a modification of my invention. In this form I provide an additional pin $e^{17}$ and links $e^{18}$. The end of the rod $e^6$ is also not provided with a yoke, and two rollers $e^{19}$ $e^{20}$ are provided on the pin $e^{17}$. In all other respects the apparatus is substantially the same as that shown in Figs. 1, 2, and 3, and its operation is substantially the same.

In Fig. 9 I have shown another modification of my invention. In this form the jointed connection is provided in the arm by which the signal is moved. $f$ designates the arm, having a slot $f'$ and provided with a lug or roller, or both, $f^2$. The end of the rod $e^6$ is provided with a pin which works in the slot $f'$. As the rod $e^6$ is moved upward the arm $f$ approaches a horizontal position, and when near the horizontal position the lug $f^2$ is brought into engagement with the rod $e^6$ or a roller carried thereby, which during the latter part of the movement of the piston is moved outward to the extremity of the slot, thus increasing the leverage of the piston in moving the signal and rendering available the then excess pressure within the cylinder for producing the desired mechanism pressure against the packings.

Referring now to Figs. 10 and 11, the jointed connection is here shown as consisting of a toggle arrangement of levers. Two levers $g$ $g'$ are pivoted at one of their ends on a pin $g^2$, carried by the rod $e^6$, and the other ends of the levers $g$ $g'$ are pivotally connected to levers $g^3$ $g^4$, which are pivoted on a common pin $g^5$, carried by the piston. Rollers $g^6$ $g^7$ are carried by the pins connecting the levers $g$ $g'$ $g^3$ $g^4$. When the piston moves upward, the rollers $g^6$ $g^7$ tend to diverge, but their divergence is prevented by the casing or housing $e^{12}$ during the greater part of the operation of the fluid-pressure apparatus; but they do diverge onto inclines $g^8$ $g^9$, provided in the casing, as shown in Fig. 11, during the latter part of the operation of the fluid-pressure apparatus. Substantially the same results are obtained in this construction as in the previous forms described.

Referring now to Figs. 12 and 13, the jointed connection is shown as comprising two levers $h$ $h'$, pivoted on a common pin carried by the rod $e^6$ and provided with cam-surfaces $h^2$ $h^3$ and rollers $h^4$ $h^5$. The stem of the piston is provided with a roller $h^6$, which engages the cam-surfaces $h^2$ $h^3$. As the piston moves upward the levers are prevented from being diverged by their rollers $h^4$ $h^5$ engaging the wall of the casing or housing $e^{12}$ during the greater part of the movement of the piston, but when the piston nears the end of its stroke the rollers $h^4$ $h^5$ ride on the inclines $h^7$ $h^8$. (See Fig. 13.) The same results are obtained in this form of the invention as in the others.

Having thus described my invention, what I claim as new is—

1. The combination in a fluid-pressure apparatus, of a cylinder provided with a packing in one of its heads of yielding material, and a piston movable in said cylinder and provided with a packing of yielding material which is adapted to seat against the packing in the cylinder-head.

2. The combination in a fluid-pressure apparatus, of a cylinder provided with a packing in one of its heads of leather treated with a lubricant, and piston movable in said cylinder and provided with a packing of leather treated with a lubricant which is adapted to seat against the leather packing in the cylinder-head.

3. The combination with a fluid-pressure apparatus comprising a cylinder and a piston movable therein, of packings in a head of the cylinder and in the piston which seat against each other at the full movement of the piston in the cylinder, of a fluid-pressure supply for said apparatus and a connection between the piston and a railway part or appliance.

4. The combination with a fluid-pressure apparatus comprising a cylinder and a piston movable therein and packings for the cylinder-head and the piston which seat against each other upon a full movement of the piston in the cylinder, of a fluid-pressure supply for said apparatus which is adapted to move the piston and to retain it in the position to which it has been moved, and a connection between the piston and a railway part or appliance.

5. The combination of a fluid-pressure apparatus comprising a piston and cylinder, a fluid-pressure supply for said apparatus, a connection between the piston and a railway part or appliance, and packings for the piston and a head of the cylinder which are seated against one another after a movement of the piston to move the railway part or appliance to prevent escape of the fluid-pressure from the cylinder.

6. The combination of a fluid-pressure apparatus comprising a piston and a cylinder, a fluid-pressure supply therefor, a connection between a railway part or appliance, a packing in a head of the cylinder and a packing in the piston which packings are seated against one another after a movement of the piston to move the railway part or appliance to prevent escape of the fluid-pressure from the cylinder when it is maintained on the piston to hold the railway part or appliance in the position to which it has been moved.

7. The combination of a fluid-pressure apparatus comprising a cylinder and a piston movable therein, a fluid-pressure supply for said apparatus, a semaphore-signal, and a connection between the piston and semaphore-signal for increasing the leverage of the piston at a predetermined part of the stroke of the piston.

8. The combination of a fluid-pressure apparatus comprising a cylinder and a piston therein, a fluid-pressure supply for said apparatus, a packing for a head of the cylinder and a packing for the piston which when seated against one another prevent escape of fluid-pressure from the cylinder, and a connection between the semaphore-signal and the piston for increasing the leverage of the piston through it at a predetermined part of the piston's stroke, whereby the fluid-pressure will be enabled to positively seat the packings against each other.

9. The combination of a fluid-pressure apparatus comprising a cylinder and a piston therein, a fluid-pressure supply for said apparatus, a semaphore-signal, a jointed connection between the semaphore-signal and the piston for increasing the leverage of the piston through it at a predetermined part of the piston's movement.

10. The combination of a fluid-pressure apparatus comprising a cylinder and a piston therein, a fluid-pressure supply for said apparatus, a semaphore-signal, a jointed connection between the piston and semaphore-signal, and means for effecting the jointed connection whereby the leverage of the piston is increased through it at a predetermined part of the piston's movement.

11. The combination of a fluid-pressure apparatus comprising a cylinder and a piston movable therein, a connection between the piston and a railway part or appliance, a fluid-pressure supply for moving said piston and holding it against a reverse movement so long as applied to the piston, and a yielding and non-porous packing for the piston and a head of the cylinder which are seated against each other by the fluid-pressure.

12. The combination of a fluid-pressure apparatus, comprising a cylinder and a piston, a fluid-pressure supply for said apparatus, a packing between a cylinder-head and the piston, a semaphore-signal, and a connection between the piston and semaphore-signal for increasing the leverage of the piston at a predetermined part of the stroke of the piston.

In testimony whereof I have signed my name to this specification in the presence of two subscribing witnesses.

JOHN PRESSLEY COLEMAN.

Witnesses:
 W. L. McDaniel,
 Geo. E. Cruse.